United States Patent [19]

United States Patent [19]

Ishiguro

[11] Patent Number: 4,570,041
[45] Date of Patent: Feb. 11, 1986

[54] DIRECTION INDICATOR
[75] Inventor: Osamu Ishiguro, Furukawa, Japan
[73] Assignee: Alps Electric Co., Ltd., Japan
[21] Appl. No.: 626,637
[22] Filed: Jul. 2, 1984
[30] Foreign Application Priority Data Jun. 30, 1983 [JP] Japan ............................ 58-100272[U]

[51] Int. Cl.⁴ ............................................. H01H 3/18
[52] U.S. Cl. ................................ 200/61.54; 200/61.34
[58] Field of Search ............... 200/61.27, 61.28, 61.29,
200/61.3, 61.31, 61.32, 61.33, 61.34, 61.35,
61.36, 61.37, 61.38, 61.54

[56] References Cited

U.S. PATENT DOCUMENTS 2,427,595 9/1947 Fuller ................................ 200/61.34
3,079,476 2/1963 Dyksterhouse ....................... 200/61.3
3,238,322 3/1966 Hergenhahn et al. ............. 200/61.34

Primary Examiner—Reinhard J. Eisenzopf
Assistant Examiner—Morris Ginsburg
Attorney, Agent, or Firm—Guy W. Shoup; Gerard F. Dunne

[57] ABSTRACT

A direction indicator is mounted on a steering column having a steering wheel shaft for use with a turn signal switch for turning on and off direction indication lamps. The direction indicator comprises a switch base mounted on the steering column, an actuator pivotally mounted on the switch base for actuating the switch and having ratchet engaging portions, a click mechanism having first pressing means such as a compression spring for positioning the actuator in one of angularly spaced right, neutral and left positions, at a time, in response to turning movement of the actuator, a cancel member integral with the steering wheel shaft and rotatable therewith in a path, a pair of ratchets supported on the actuator and movable into the path in response to turning movement of the actuator into the right and left positions, each of the ratchets having opposite ends engageable with the ratchet engaging portions, respectively, and second pressing means such as a compression spring acting on each of the ratchets for urging the ratchets toward the steering wheel shaft to press the opposite ends thereof against the ratchet engaging portions, respectively. Each of the ratchets having a central locking prong projecting toward the steering wheel shaft and engageable with the cancel member.

6 Claims, 6 Drawing Figures

DIRECTION INDICATOR

BACKGROUND OF THE INVENTION

The present invention relates to a direction indicator switch having an actuator positionable in a right or left position by a click mechanism and a cancel mechanism for automatically returning the actuator from the right or left position to a neutral position in response to rotation of a steering wheel shaft.

Conventional direction indicators known as turn signal switches for use in automobiles include a cancel mechanism for automatically returning a turn lever from a right or left position to a neutral position in response to angular movement of a steering wheel shaft. The prior direction indicators have proven unsatisfactory in that the turn lever is likely to be broken or damaged if forcibly held in position against returning movement at the time the steering wheel shaft is turned back.

SUMMARY OF THE INVENTION

It is an object of the present invention to provide a direction indicator having a turn lever which is not broken or damaged even if forcibly gripped against a returning movement at the time the turn lever is to be automatically returned from a right position or a left position to a neutral position in response to turning movement of a steering wheel shaft.

According to the present invention, there is provided a direction indicator mounted on a steering column having a steering wheel shaft for use with a turn signal switch for turning on and off direction indication lamps, the direction indicator comprising a switch base mounted on the steering column, an actuator pivotally mounted on the switch base for actuating the switch and having ratchet engaging portions, a click mechanism having first pressing means for positioning the actuator in one of angularly spaced right, neutral and left positions, at a time, in response to turning movement of the actuator, a cancel member integral with the steering wheel shaft and rotatable therewith in a path, a pair of ratchets supported on the actuator and movable into the path in response to turning movement of the actuator into the right and left positions, each of the ratchets having opposite ends engageable with the ratchet engaging portions, respectively, and second pressing means acting on each of the ratchets for urging the ratchets toward the steering wheel shaft to press the opposite ends thereof against the ratchet engaging portions, respectively, each of the ratchets having a central locking prong projecting toward the steering wheel shaft and engageable with the cancel member.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
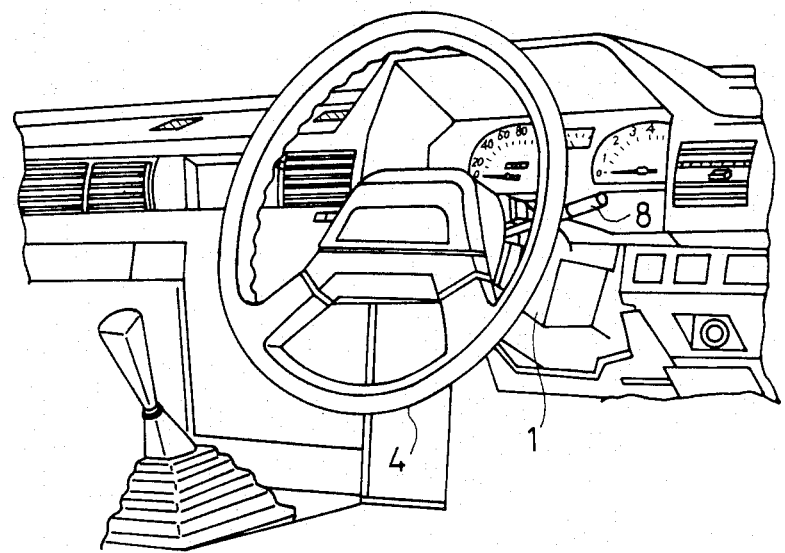
FIG. 1 is a perspective view of a steering wheel and surrounding parts in an automobile.

The principles of the present invention are particularly useful when embodied in a direction indicator such as a turn signal switch as shown in FIG. 1. In FIG. 1, a steering wheel 4 is mounted on a steering column (not shown) covered with a cover 1.

Figure 2:
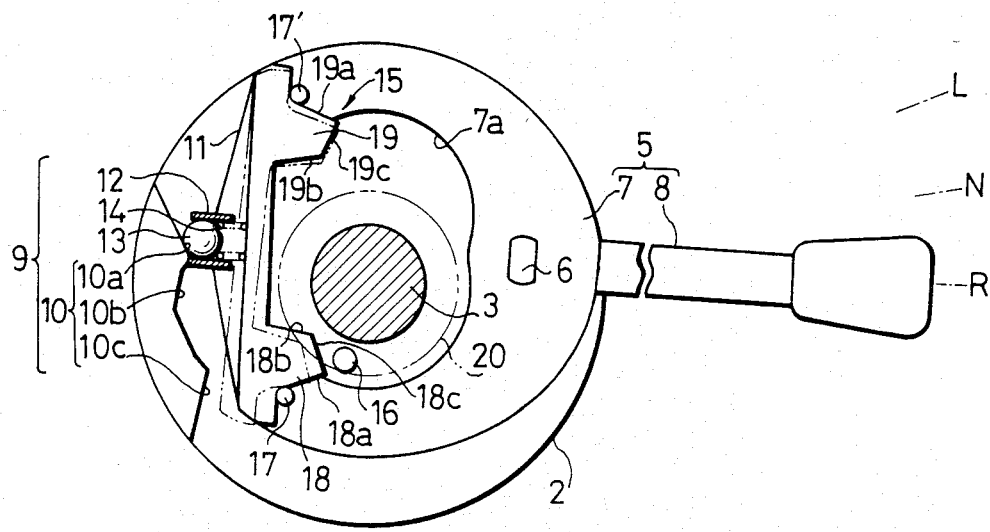
FIGS. 2 and 3 are plan views, partly in cross section, of a conventional direction indicator.

Prior to describing the present invention, conventional direction indicators will first be described with reference to FIGS. 2 and 3. As shown in FIG. 2, a switch base 2 is fixed to the steering column, and a steering wheel shaft 3 extends through the switch base 2 and is rotatably supported by the steering column. The switch base 2 is covered with the cover 1 (FIG. 1). The steering wheel 4 is attached to an upper end of the steering wheel shaft 3.

On the switch base 2, there is mounted a switch (not shown) for turning on and off turn signal lamps and there is also pivotally mounted an actuator 5 for actuating the switch. The actuator 5 is composed of a turn bracket or turntable 7 pivotally mounted by a pivot shaft 6 on one surface of the switch base 2 and a turn lever (winker lever) 8 integral with the turn bracket 7. The turn bracket 7 has an oblong hole 7a through which the steering wheel shaft 3 extends.

A click mechanism 9 is interposed between the switch base 2 and the turn bracket 7 for positioning the actuator 5 selectively in right position R, a neutral position N, or a left position L. The click mechanism 9 comprises a positioning cam 10 on the switch base 2, a sleeve 12 on a ratchet body 11, a detent ball 13 disposed in the sleeve 12, and a compression spring 14 pressing the detent ball 13 against the positioning cam 10. The positioning cam 10 includes a slant surface 10a for positioning the actuator 5 in the right position R, a recess 10b for positioning the actuator 5 in the neutral position N, and a slant surface 10c for positioning the actuator 5 in the left position L, the positioning recess 10b being substantially in the shape of a V.

A cancel mechanism 15 is interposed between the turn bracket 7 and the steering wheel shaft 3 for automatically returning the actuator 5 from the right position R or the left position L to the neutral position N in response to turning movement of the steering wheel shaft 3. The cancel mechanism 15 comprises a cancel pin (cancel member) 16 integral with the steering wheel shaft 3, ratchet locking pins 17, 17' projecting from the turn bracket 7, the rachet body 11 (described above) pressed against the ratchet locking pins 17, 17' by the compression spring 14, and ratchets 18, 19 projecting from the ends of the ratchet body 11. The ratchet 18 has a slant surface 18a facing the locking pin 17, a slant surface 18b facing away from the slant surface 18a, and a top slant surface 18c contiguous to the slant surfaces 18a, 18b. Likewise, the ratchet 19 has a slant surface 19a facing the locking pin 17', a slant surface 19b facing away from the slant surface 19a, and a top slant surface 19c contiguous to the slant surfaces 19a, 19b.

In operation, the turn lever 8 is turned about the pivot shaft 6 to angularly move the turn bracket 7 to thereby cause the detent ball 13 of the click mechanism 9 to slidably move on the positioning cam 10. When the detent ball 13 is resiliently held against the positioning surface 10a, the turn lever 8 is in the right position R. When the detent ball 13 is positioned in the positioning recess 10b, the turn lever 8 is in the neutral position N.

When the detent ball 13 is resiliently held against the positioning surface 10c, the turn lever 8 is in the left position L.

When the steering wheel shaft 3 is angularly moved clockwise while the turn lever 8 is in the right position R as shown in FIG. 2, the cancel pin 16 rotating in unison with the steering wheel shaft 3 pushes the slant surface 18c against the resilient force of the compression spring 14 to displace the ratchet 18 out of a path 20 of rotation of the cancel pin 16. During this time, the detent ball 13 remains positionally unchanged.

When the steering wheel shaft 3 is angularly moved counterclockwise from this position, the cancel pin 16 rotating in unison with the steering wheel shaft 3 pushes the slant surface 18b. The ratchet body 11 is then subjected to forces tending to rotate the ratchet body 11 clockwise about the locking pin 17. Since the slant surface 19a of the ratchet 19 is held against the locking pin 17', however, the ratchet body 11 is prevented from turning clockwise about the locking pin 17. In addition, the locking pin 17 prevents the ratchet 18 from escaping as indicated by the two-dot-and-dash lines. When the steering wheel shaft 3 is further turned counterclockwise, the cancel pin 16 is brought into abutment against the ratchet 18 to cause the ratchet 18, the ratchet body 11, and the turn bracket 7 to turn counterclockwise in unison with the steering wheel shaft 3. The detent ball 13 of the click mechanism 9 is then slid onto a slant surface of the positioning recess 10b, from which the detent ball 13 is quickly displaced toward the bottom of the positioning recess 10b under the resilient force of the compression spring 14. At the same time, the turn bracket 7 is turned counterclockwise to move the turn lever 8 automatically back to the neutral position N, with simultaneous displacement of the ratchet 18 out of the path 20 of rotation of the cancel pin 16. Such automatic returning of the turn lever 8 to the neutral position N can similarly be effected when the turn lever 8 has been in the left position L.

The prior direction indicator as shown in FIG. 2 has the following drawback. Since the ratchet 18 cannot escape as indicated by the two-dot-and-dash lines at the time the turn lever 8 is automatically returned, the turn lever 8 can be broken or otherwise damaged if the turn lever 8 is gripped against movement when the turn lever 8 is automatically being forced to return to the right position R or the left position L by cancel pin 16.

Figure 3:
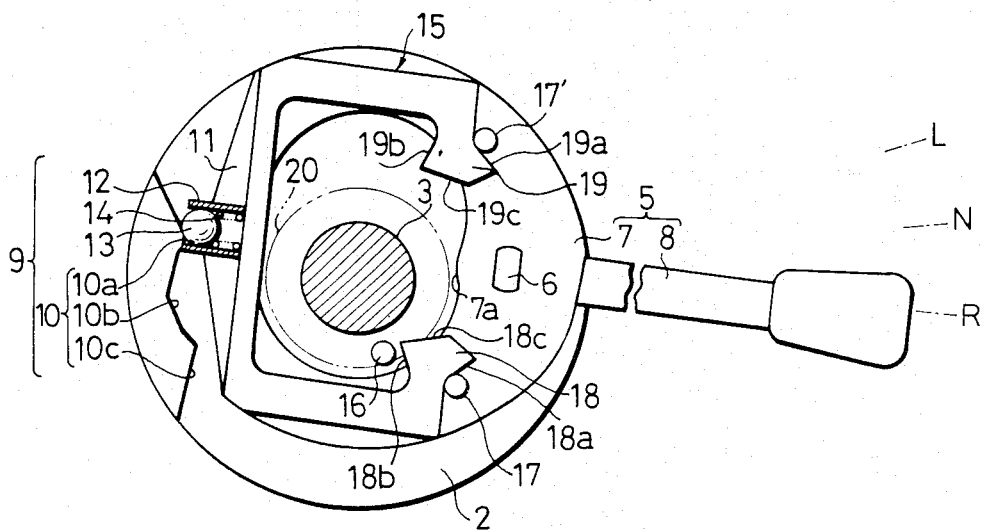

FIG. 3 shows another prior direction indicator having a substantially C-shaped ratchet body 11. The direction indicator of FIG. 3 suffers from the same problem in that the turn lever 8 tends to be broken or damaged if gripped in position against returning movement.

The present invention will now be described with reference to FIGS. 4 through 6. Like or identical parts in FIGS. 4 through 6 are denoted by like or identical reference characters in FIGS. 2 and 3, and will not be described in detail.

Figure 4:
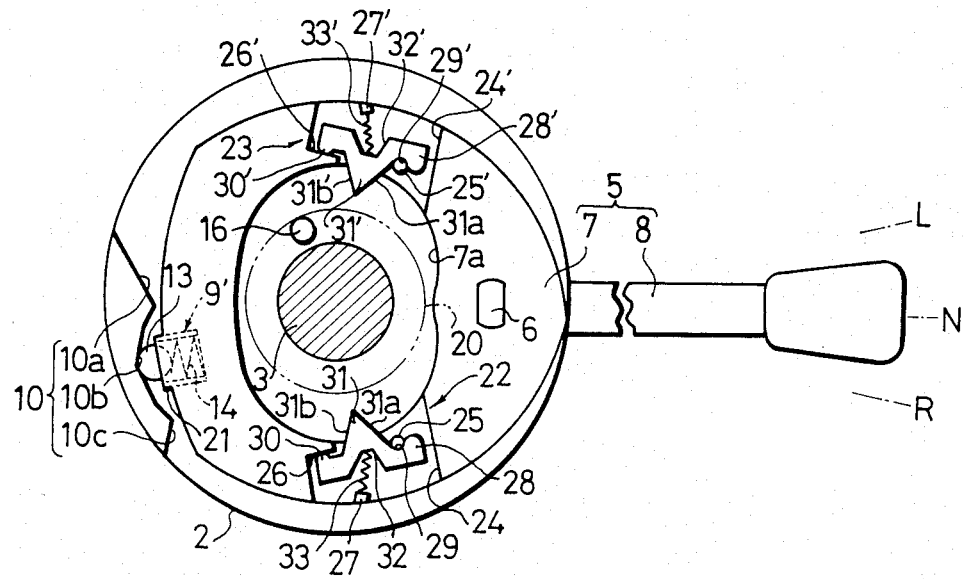
FIGS. 4 and 5 are plan views, partly in cross section, of a direction indicator according to the present invention.
Figure 5:
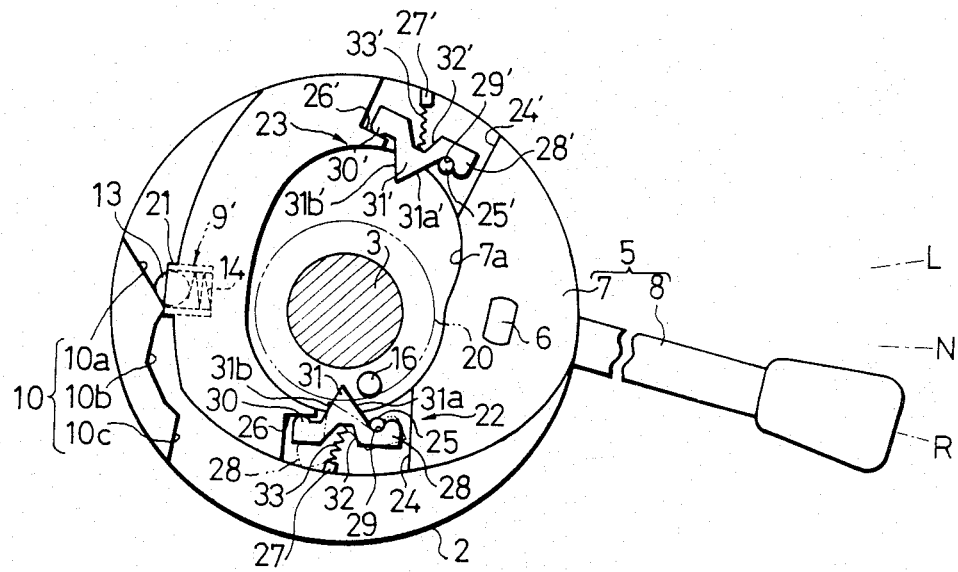
Figure 6:
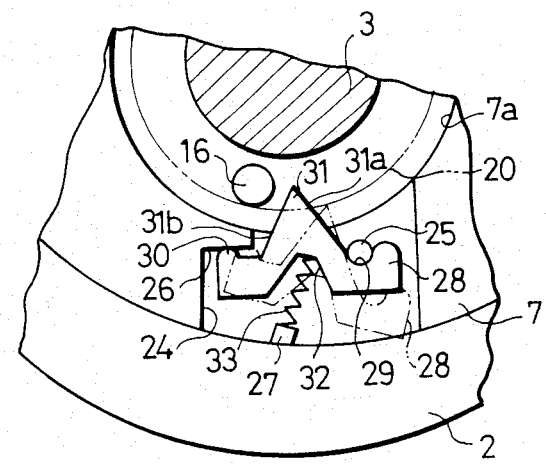
FIG. 6 is an enlarged fragmentary plan view of the direction indicator of the present invention.

As shown in FIGS. 4 and 5, a click mechanism 9' is interposed between distal ends of a switch base 2 and a turn bracket 7. The click mechanism 9' is composed of a positioning cam 10 on the switch base 2, a sleeve 21 on the distal end of the turn bracket 7, a detent ball 13 disposed in the sleeve 21, and a compression spring 14 interposed between the detent ball 13 and the bottom of the sleeve 21 for pressing the detent ball 13 against the positioning cam 10.

A cancel mechanism 22 is interposed between one side of the turn bracket 7 and a steering wheel shaft 3 for automatically returning an actuator 5 from a right position R to a neutral position N in response to turning movement of the steering wheel shaft 3. Another cancel mechanism 23 is interposed between an opposite side of the turn bracket 7 and a steering wheel shaft 3 for automatically returning the actuator 5 from a left position L to the neutral position N in response to turning movement of the steering wheel shaft 3. These cancel mechanisms 22, 23 have a common cancel pin 16.

The cancel mechanisms 22, 23 are completely separate from the click mechanism 9'. The cancel mechanism 22 includes a recess 24 defined in a peripheral side portion of the turn bracket 7 for loosely retaining a ratchet 28 therein, a fixed pin (ratchet engaging portion) 25 projecting from one side of the recess 24, a stopper step (ratchet engaging portion) 26 on an opposite side of the recess 24, and a spring seat 27 projecting from an outer edge of the recess 24. The cancel mechanism 22 also has a ratchet 28 disposed in the recess 24. The ratchet 28 has a recess 29 defined in one end thereof and in which the fixed pin 25 engages, a projection 30 on the other and which is held against the stopper step 26, and a locking prong 31 projecting from an intermediate portion thereof between the recess 29 and the projection 30 into the oblong hole 7a. The fixed pin 25 is located closer to the turn lever 8 than the projection 30 is. The locking prong 31 has slant surfaces 31a, 31b for abutting engagement with the cancel pin 16 on rotation of the steerimg wheel shaft 3 in one direction or the other. The cancel mechanism 22 also has a compression spring 33 interposed between a spring seat recess 32 of the ratchet 28 and the spring seat 27.

The ratchet 28 of the above structure can turn about its ends. On such turning movement, the locking prong 31 of the ratchet 28 can be moved toward and away from the steering wheel shaft 3 in a certain range defined by the stopper step 26, the fixed pin 25, and the spring seat 27.

The cancel mechanism 23 is of the same construction as that of the cancel mechanism 22 and will not be described in detail with the same parts indicated by the same reference characters with a prime.

Operation of the direction indicator thus constructed is as follows:

When the turn lever 8 is turned, it is caused by the click mechanism 9' to be located in the right position R, the neutral position N, or the left position L. While the turn lever 8 is in the neutral position N, the locking prongs 31, 31' of the ratchets 28, 28' are positioned radially outwardly of a path 20 of rotation of the cancel pin 16. When the turn lever 8 is in the right position R as shown in FIG. 5, only the locking prong 31 of the ratchet 28 projects into the path 20. Upon the turning lever 8 positioned in the left position L, only the locking prong 31' of the ratchet 28' projects into the path 20.

When the steering wheel shaft 3 is turned clockwise while the turn lever 8 is in the right position R as illustrated in FIG. 5, the cancel pin 16 rotating in unison with the steering wheel shaft 3 presses the slant surface 31a against the resilient force of the compression spring 33. The locking prong 31 of the ratchet 28 is then caused to rotate about fixed pin 25 and to be displced radially out of the path 20 as indicated by the two-dot-and-dash lines. Upon subsequent disengagement of the cancel pin 16 from the locking prong 31, the locking prong 31 resiliently projects into the path 20 under the resilient force of the compression spring 33.

When the steering wheel shaft 3 is thereafter turned counterclockwise, with the turn lever 8 not being held back, the cancel pin 16 is brought into pressing engagement with the slant surface 31b of the locking prong 31. At this time, the ratchet 28 is subjected to forces tending to turn the ratchet 28 clockwise about the fixed pin 25. However, since the projection 30 of the ratchet 28 at the end thereof remote from the fixed pin 25 is held in abutment against the stopper step 26, the ratchet 28 is prevented from being turned clockwise. As a consequence, counterclockwise rotation of the steering wheel shaft 3 causes the cancel pin 16 to engage the slant surface 31b of the locking prong 31, thus turning the ratchet 28 and the turn bracket 7 counterclockwise in unison with the steering wheel shaft 3. The detent ball 13 of the click mechanism 9' is then slid onto a slant surface of the positioning recess 10b, from which the detent ball 13 is rapidly displaced toward the bottom of the positioning recess 10b under the resilient force of the compression spring 14. At this time, the turn lever 8 is returned to the neutral position N, and the locking prong 31 of the ratchet 28 is displaced out of the path 20. Such automatic returning movement of the turn lever 8 is effected when the turn lever 8 has been in the left position L.

However, if the turn lever 8 is firmly gripped against rotation at the time it is to be automatically returned, the compression spring 33 is compressed under the pressing force of the cancel pin 16 acting on the slant surface 31b. Simultaneously, the ratchet 28 is turned clockwise about the projection 30 bearing against the stopper step 26, thereby allowing the locking prong 31 to escape out of the path 20, as illustrated in FIG. 6. As a result, the turn lever 8 is subjected to no undue forces at the time the turn lever 8 is to be automatically returned, and hence will not be broken or otherwise damaged. Such operation holds true when the turn lever 8 is in the left position.

With the arrangement of the present invention, when the steering wheel is turned in one direction or the other with the actuator firmly gripped in the right or left position, the cancel pin or member presses the locking prong to turn the ratchet about one of its opposite ends and simultaneously displaces the locking prong out of the path of rotation of the cancel member while compressing the compression spring. As a result, even when the actuator is inadvertently or accidentally fixed in the right or left position at the time it is to be automatically returned to the neutral position, the ratchet or the cancel member is prevented from being damaged and the turn lever, which is slender and low in mechanical strength, of the actuator is also reliably prevented from being damaged or broken.

The ratchet is resiliently urged by the compression spring which is separate from the compression spring of the click mechanism. This allows two separate ratchets, which have conventionally been interconnected, to be individually urged by respective compression springs. Even if the two ratchets may not be positioned symmetrically with respect to the click mechanism, operating forces of the ratchets and the click mechanism are not different from each other, and hence are available stably. In addition, the ratchets can be relatively small in size and can be installed in relatively small spaces.

Although a certain preferred embodiment has been shown and described, it should be understood that many changes and modifications may be made therein without departing from the scope of the appended claims.

What is claimed is:

1. A direction indicator on a steering column having a steering wheel shaft for use with a switch for turning on and off direction indication lamps, comprising:
    (a) a switch base mounted on the steering column;
    (b) an actuator pivotally mounted on said switch base for actuating the switch and having ratchet engaging portions and a pair of recesses formed therein;
    (c) a click mechanism having first pressing means for positioning said actuator in one of angularly spaced right, neutral and left positions, at a time, in response to turning movement of the actuator;
    (d) a cancel member integral with said steering wheel shaft and rotatable therewith in a path;
    (e) pair of ratchets each loosely supported in a respective recess of said actuator and having a first portion movable into said path in response to turning movement of said actuator into said right and left positions, each of said ratchets having a second portion loosely retained in its respective recess;
    (f) second pressing means acting on each of said ratchets for urging the ratchets toward said steering wheel shaft to press opposite ends thereof against said ratchet engaging portions, respectively; and
    (g) each of said ratchets having a central locking prong projecting toward said steering wheel shaft and engageable with said cancel member.

2. A direction indicator according to claim 1, wherein said second pressing means comprises a compression spring.

3. A direction indicator according to claim 1, wherein each of said ratchets has a central portion urged by said second pressing means toward said steering wheel shaft.

4. A direction indicator according to claim 1, wherein said actuator has a pair of fixed pins and a pair of stopper steps spaced from said fixed pins, in said pair of recesses, respectively, and each of said ratchets having in one of the opposite ends thereof in said second portions a pin engaging recess in which one of said fixed pins engages and also having on the other end thereof a projection held against one of said stopper steps, said central locking prong projecting between said pin engaging recess and said stopper step toward said steering wheel shaft.

5. A direction indicator according to claim 4, wherein said each of said ratchets is pivotally movable about and movable away from said fixed pin.

6. A direction indicator according to claim 4, wherein said actuator comprises a turntable pivotally mounted on said switch base and a turn lever extending radially outwardly from and integral with said turntable, said fixed pin being mounted on said turntable and located closer to said turn lever than said projection is.

* * * * *